United States Patent
Ponder et al.

(10) Patent No.: US 7,320,763 B2
(45) Date of Patent: Jan. 22, 2008

(54) REFRIGERANT FOR LOW TEMPERATURE APPLICATIONS

(75) Inventors: Kenneth M Ponder, Cumming, GA (US); Steffen Thomas, Buckhead, GA (US)

(73) Assignee: Stefko Properties, LLC, Alpharetta, GA (US)

( * ) Notice: Subject to any disclaimer, the term of this patent is extended or adjusted under 35 U.S.C. 154(b) by 0 days.

(21) Appl. No.: 11/320,492

(22) Filed: Dec. 28, 2005

(65) Prior Publication Data

US 2006/0191665 A1     Aug. 31, 2006

Related U.S. Application Data

(60) Provisional application No. 60/639,677, filed on Dec. 28, 2004.

(51) Int. Cl.
    *C09K 5/04*     (2006.01)
(52) U.S. Cl. .................................................... 252/68
(58) Field of Classification Search .................. 252/68
    See application file for complete search history.

(56) References Cited

U.S. PATENT DOCUMENTS

| | | |
|---|---|---|
| 3,092,981 A | 6/1963 | Begeman |
| 3,642,634 A | 2/1972 | Olund |
| 3,733,850 A | 5/1973 | Olund |
| 4,046,533 A | 9/1977 | Olund |
| 4,971,712 A | 11/1990 | Gorski |
| 4,983,312 A | 1/1991 | Tamura |
| 5,053,155 A | 10/1991 | Mahler |
| 5,145,594 A | 9/1992 | Anton |
| 5,254,280 A | 10/1993 | Thomas et al. |
| 5,384,057 A | 1/1995 | Wilczek |
| 5,417,872 A | 5/1995 | Fukuda et al. |
| 5,492,643 A | 2/1996 | Weber |
| 5,942,149 A | 8/1999 | Weber |
| 5,976,399 A * | 11/1999 | Schnur .................. 252/68 |

(Continued)

FOREIGN PATENT DOCUMENTS

EP          693546      * 1/1996

(Continued)

OTHER PUBLICATIONS

ASHRAE Standard Designation and Safety Classification of Refrigerants, ANSI/ASHRAE Addendum c to ANSI/ASHRAE Standard 34-2001, American Society of Heating, Refrigerating and Air-Conditioning Engineers, Inc. (2003).

(Continued)

*Primary Examiner*—John R. Hardee
(74) *Attorney, Agent, or Firm*—Thomas, Kayden, Horstemeyer & Risley LLP; Todd Deveau

(57) ABSTRACT

An apparatus and method wherein potential ozone layer-damaging chlorodifluoromethane (Refrigerant R-22) is substituted with a mix of less environmentally damaging refrigerants pentafluoroethane and tetrafluoroethane in chlorodifluoromethane-based air-cooling systems for low temperature applications. While less environmentally damaging than chlorodifluoromethane, the substitute refrigerant has a temperature-pressure relationship similar to that of chlorodifluoromethane, making the substitute refrigerant suitable for use with chlorodifluoromethane-based low temperature systems. In this event, it is mixed with a relatively small percentage of a lubricating oil which is compatible with both the unit refrigerant and typical R-22 system design.

14 Claims, 1 Drawing Sheet

U.S. PATENT DOCUMENTS

| | | | |
|---|---|---|---|
| 6,261,474 B1 | 7/2001 | Egawa et al. | |
| 6,428,720 B1 | 8/2002 | Roberts | |
| 6,565,766 B1 | 5/2003 | Weber | |

FOREIGN PATENT DOCUMENTS

| | | | |
|---|---|---|---|
| EP | 1295928 | * | 3/2003 |
| WO | WO 91/09090 | * | 6/1991 |
| WO | WO 01/23493 | * | 4/2001 |
| WO | WO01/23493 | | 4/2001 |

OTHER PUBLICATIONS

ASHRAE Standard Designation and Safety Classification of Refrigerants, ANSI/ASHRAE Addendum h to ANSI/ASHRAE Standard 34-2004, American Society of Heating, Refrigerating and Air-Conditioning Engineers, Inc. (2006).

ASHRAE Standard Designation and Safety Classification of Refrigerants, ANSI/ASHRAE Addendum d to ANSI/ASHRAE Standard 34-2001, American Society of Heating, Refrigerating and Air-Conditioning Engineers, Inc. (2003).

ASHRAE Standard Designation and Safety Classification of Refrigerants, ANSI/ASHRAE Addendum e to ANSI/ASHRAE Standard 34-2001, American Society of Heating, Refrigerating and Air-Conditioning Engineers, Inc. (2003).

Designation and Safety Classification of Refrigerants, ANSI/ASHRAE Addenda a, b, c, e, f, k, n, o, p, q, r, s and u to ANSI/ASHRAE Standard 34-2004, American Society of Heating, Refrigerating and Air-Conditioning Engineers, Inc. (2006).

* cited by examiner

REFRIGERANT FOR LOW TEMPERATURE APPLICATIONS

CROSS-REFERENCE TO RELATED APPLICATION

This application claims priority to U.S. provisional application entitled, "Refrigerant with Lubricating Oil for Refrigerant R22-Based Low and Medium Temperature Applications," having Ser. No. 60/639,677, filed Dec. 28, 2004, which is incorporated herein by reference.

BACKGROUND OF THE INVENTION

1. Field of the Invention

The present invention relates to the replacement of Refrigerant R-22 (chlorodifluoromethane) refrigerant, as well as replacement of R-502 (a 48.8/51.2 mixture of chlorodifluoromethane and chloropentafluoroethane), R-402 (a 38/2/60 mixture of pentafluoroethane, propane, and chlorodifluoromethane), R404a (a 44/52/4 mixture of pentafluoroethane, trifluoroethane and tetrafluoroethane) R-408a (a 7/46/47 mixture of pentafluoroethane, trifluoroethane, and R-22 chlorodifluoromethane) and R-507a (a 50/50 mixture of pentafluoroethane and trifluoroethane) refrigerants in low temperature applications with a blend refrigerant that is less damaging to the ozone layer in systems designed to use. By low temperature applications is meant applications below about 0° F. and generally in the range of below about −5° to about −40° F.

More particularly the present invention relates to an improved refrigerant composition, method and apparatus for refrigeration wherein two non-Refrigerant R-22 refrigerants are mixed in a defined ratio such that the temperature-pressure relationship of the mix approximates that of the refrigerant to be replaced. The mixture is compatible with Refrigerant R-22 (chlorodifluoromethane) so that it can be added to supplement and replace Refrigerant R-22 (chlorodifluoromethane) in low temperature applications, as well as R-502, R-402, R-404a, R-408a and R507a. A further particularity of the instant invention relates to an improved method and apparatus for refrigeration wherein refrigerant mixture optionally is mixed with a soluble lubricating oil to provide lubrication to the apparatus. The lubricant is soluble in both the mixture of the invention and the refrigerant to be replaced, in particular Refrigerant R-22 (chlorodifluoromethane) refrigerant.

2. General Background

Until recently, R-22 refrigerant chlorodifluoromethane (hereinafter sometimes called "Refrigerant R-22 (chlorodifluoromethane)") was the major, if not sole refrigerant, used in residential air-conditioners, refrigerators, freezers and window air-conditioning units. Refrigerant R-22 (chlorodifluoromethane) is a trademark of E. I. du Pont de Nemours & Co. Inc. for chlorodifluoromethane. Hereinafter, "Refrigerant R-22 (chlorodifluoromethane)" is used in this specification to denote chlorodifluoromethane, regardless of the source.

Recently, however, Refrigerant R-22 (chlorodifluoromethane) has come under attack both nationally and internationally as an ozone layer-damaging chemical. In recent years, both the national and international scientific communities have linked Refrigerant R-22 (chlorodifluoromethane) with damage to the earth's protective ozone layer. Air-conditioners, refrigerator/freezers and window air-conditioning units containing R-22 are believed to be a global source of ozone-damaging material.

In response to scientific concern and a national and global outcry over the use of Refrigerant R-22 (chlorodifluoromethane) in air-conditioning, the United States Congress has acted to first reduce and then ban the use of Refrigerant R-22 (chlorodifluoromethane) in air-conditioning units.

As a first step toward phasing out the use of Refrigerant R-22 (chlorodifluoromethane) in air-conditioning units, Congress is phasing out the use of Refrigerant R-22 (chlorodifluoromethane) in new equipment effective Jan. 1, 2015 and has banned the sale of Refrigerant R-22 (chlorodifluoromethane) in any size container as of Jan. 1, 2020. One of the first areas in which the use of Refrigerant R-22 (chlorodifluoromethane) is to be phased out is in the Bakery industry under the Bakery Partnership Program. Another step in phasing out the use of R-22 is the import restrictions that began in 2003, limiting the amount of R-22 that can be imported into the United States.

At the time of this application, the vast majority of residential, window units and freezers in use in the United States contain Refrigerant R-22 (chlorodifluoromethane).

Prior to banning the sale of quantities of Refrigerant R-22 (chlorodifluoromethane), owners of equipment with Refrigerant R-22 (chlorodifluoromethane)-based air-conditioning units are able to purchase the level of refrigerant in their equipment with only the need of a refrigerants license as required by the Clean Air Act. Millions of units containing refrigerant R-22 (chlorodifluoromethane) were sold in the United States prior to the start of mandatory phase out set forth by Congress and the international community.

Refrigerant R-22 (chlorodifluoromethane) recharging typically involves 30 lb. cans or cylinders typically used in the HVAC/R industry. The cylinders are fitted with a dispensing outlet compatible with a commercially available refrigeration manifold. In order to recharge an air-conditioning system, a customer need to only fit the can or cylinder to the manifold and discharge, or "add to" the refrigerant charge directly into the air conditioning system.

Following Congress's ban on the sale of Refrigerant R-22 (chlorodifluoromethane) millions of equipment owners with Refrigerant R-22 (chlorodifluoromethane)-based air-conditioning units will be left with no choice other than to seek replacement refrigerants to service these units. Intentionally mixing of refrigerants is currently illegal by standards set forth by the Clean Air Act. An example would be for this application is that current R-22 units could not be mixed with this invention intentionally.

In response to Congress's ban on the use of Refrigerant R-22 (chlorodifluoromethane), service dealers have began to retrofit existing Refrigerant R-22 (chlorodifluoromethane)-based units in low temperature applications with new, non-R-22 refrigerants, such as the aforementioned R-502, R-402, R-404a, R-408a and R-507a. Some of these replacements, such as R-502, R-402 and R-408a, still include, in part, the R-22 refrigerant chlorodifluoroethane.

The refrigerants that will be authorized by the Environmental Protection Agency (EPA) to replace Refrigerant R-22 (chlorodifluoromethane) in air conditioners is currently under review and will evolve to require a environmentally safe refrigerant, with a 0 odp factor like the one of the present invention described herein. Unfortunately, most replacements for R-22 have a markedly different temperature-pressure relationship at most operating temperatures than Refrigerant R-22 (chlorodifluoromethane).

Because of this difference in the temperature-pressure relationship of Refrigerant R-22 (chlorodifluoromethane) and current replacement refrigerants, existing Refrigerant R-22 (chlorodifluoromethane)-based systems cannot typically be interchanged. Hence, non-retrofitted, Refrigerant R-22 (chlorodifluoromethane)-based units have a need for a refrigerant that will fulfill the requirements of the system design while also meeting the requirements of the EPA and the international community.

Simply mixing refrigerants with existing Refrigerant R-22 (chlorodifluoromethane) in order to replenish, or "topping off" the level is against the law and not feasible. When other refrigerants are mixed with Refrigerant R-22 (chlorodifluoromethane), the mixture can take on the pressure characteristics of a substance that could be harmful to either the equipment or the operator. The temperature-pressure relationship becomes markedly different from that of Refrigerant R-22 (chlorodifluoromethane) at temperatures within the normal refrigerant operating temperature range and typical use of R-22.

Hence, in the absence of Refrigerant R-22 (chlorodifluoromethane) owners of Refrigerant R-22 (chlorodifluoromethane)-based equipment face but one choice when the level of their coolant is low: professional service—at a significant cost—to remove the existing Refrigerant R-22 (chlorodifluoromethane), and retrofit the system compatible with some kind of replacement refrigerant gas.

R-22 refrigerants were developed to replace the prior, now banned R-12 refrigerant, or dichlorodifluoromethane. R-12 is sometimes referred to as FREON 12®, which is a trademark of E.I. du Pont de Nemours & Co. for dichlorodifluoromethane.

Thomas et al. (U.S. Pat. No. 5,254,280) discloses a lubricant developed for use with a refrigerant known as R134a (1,1,1,2-tetrafluoroethane) and the combination of that lubricant with a refrigerant, which is a replacement for R-12. The lubricant contains polyoxyalkylene glycol, which is hydrophilic and could damage the system as discussed below.

Wilczek (U.S. Pat. No. 5,384,057), Gorski (U.S. Pat. No. 4,971,712), and Anton of DuPont (U.S. Pat. No. 5,145,594) disclose other R-12 replacements in the form of a blend of certain synthetic lubricants in various R134a and R134a/R125 refrigerant systems. The DuPont patents discuss a gas known as R125 (pentafluoroethane). R125 has five fluorine atoms bonded to an ethane molecule. This is a very large molecule for a refrigerant. It is currently being produced for refrigeration only. Anton discloses the use of a lubricant comprising at least one cyanocarbon compound. Wilczek discloses a fluorosiloxane as a lubricant. Gorski discloses a polyakylene glycol as a lubricant.

Systems that contain R-22, or R-12 replacements, are still being produced today. These older systems have common components: R-22, R-22 mineral oil lubricant, and water that is sequestered into the dryer. If R134a (1,1,1,2-tetrafluroethane) were added to the system, it would damage the system as follows: (1) if no lubricant is added to the R134a (as in U.S. Pat. No. 4,953,312 to Tamura et al.), then the R-22 system would be starved for lubricant, since the R134a gas is not miscible with the mineral oil lubricant; (2) if a synthetic lubricant is added to the R134a (as in Thomas et al.), then there is a different problem—that of moisture. Older systems can have water trapped in their dryers. The synthetic lubricants (such as polyglycol- or polysiloxane-based lubricants) are hydrophilic. Thus, they are not only miscible with R-22 and R134a; they are also partially or completely miscible with water. Thus, if they are introduced into an R-22 system, they will pull this water out of the dryer into the refrigerant flow, initiating corrosion and damage to pressure switches and the TX valve and possible other system components. This is why Elf Atochem and DuPont, to name a few publish elaborate flushing procedures and high efficiency dryer change-outs to prevent damage to the cooling system.

Weber (U.S. Pat. Nos. 5,942,149, 5,492,643 and 6,565,766) disclose yet another R-12 replacement consisting of a blend of chlorodifluoroethane, tetrafluoroethane and a napthenic lubricating oil.

SUMMARY OF THE PRESENT DISCLOSURE

The present disclosure is of a method and apparatus that are environmentally sound alternatives to the use of Refrigerant R-22 (chlorodifluoromethane), R-502 (a 48.8/51.2 mixture of chlorodifluoromethane and chloropentafluoroethane), R-402 (a 38/2/60 mixture of pentafluorethane, propane and chlorodifluoromethane), R-404a (a 44/52/4 mixture of pentafluoroethane, trifluoroethane and tetrafluoroethane), R-408a (a 7/46/47 mixture of pentafluoroethane, trifluoroethane and R-22 chlorodifluoromethane) and R-507a (a 50/50 mixture of pentafluoroethane and trifluoroethane) as a refrigerant in low temperature applications. More particularly, the invention provides a mixture of at least two refrigerants that are miscible with each other, and compatible with the refrigerant to be replaced, in particular Refrigerant R-22 (chlorodifluoromethane), while at the same time possessing a temperature-pressure profile that approximates that of Refrigerant R-22 (chlorodifluoromethane) in the low temperature range of R-22 usually encountered by low temperature systems, such as refrigerated transport, walk-in freezers, frozen drink machines, cold storage, reach-in cold storage, self-contained freezer cabinets, supermarket pak systems, bakery applications, dairy chillers, or other apparatus utilizing Refrigerant R-22 (chlorodifluoromethane) as a refrigerant at low temperatures. The invention optionally provides a lubricant, that is compatible with both the environmentally sound refrigerant disclosed herein and with Refrigerant R-22 (chlorodifluoromethane), so that mixtures of the refrigerant disclosed herein and Refrigerant R-22 (chlorodifluoromethane) may be utilized with this lubricant in the refrigeration systems without deleterious effect upon moving parts of the refrigerating apparatus that require lubrication from the refrigerant, and likewise the other aforementioned refrigerants.

More particularly, the refrigerant and method disclosed herein involve a mixture of pentafluoroethane and tetrafluoroethane in specific proportions that provide a temperature-pressure relationship that approximates that of Refrigerant R-22 (chlorodifluoromethane) in the low temperature operating conditions in which Refrigerant R-22 (chlorodifluoromethane) is a useful refrigerant. The pentafluoroethane/tetrafluoroethane refrigerant blend disclosed herein is compatible with both synthetic and mineral oils. The tetrafluoroethane can be either 1,1,1,2-tetafluoroethane or 1,1,2,2-tetrafluoroethane. In an exemplary embodiment, the refrigerant according to the invention comprises a ratio of from about 80 to about 90 weight percent pentafluoroethane to about 10 to about 20 percent tetrafluoroethane, based upon the total weight of pentafluoroethane and tetrafluoroethane. In a further exemplary embodiment, the refrigerant includes about 84 to about 86 weight percent pentafluoroethane to about 14 to about 16 weight percent tetrafluoroethane. In yet a further exemplary embodiment, the refrigerant includes the ratio of about 85 weight percent pentafluoroethane to about 15 weight percent tetrafluoroethane.

In addition, the refrigerant according to the invention optionally includes one or more lubricating oils that are soluble in chlorodifluoromethane, pentafluoroethane, and tetrafluoroethane either alone or when mixed together.

In an exemplary embodiment, the lubricating oil is a polyol ester (POE) based lubricating oil or a man-made synthetic alkyl aromatic lubricant, such as alkylbenzene. In another exemplary embodiment, the lubricating oil can be a mixture of oils, that is soluble in chlorodifluoroethane and tetrafluoroethane. The lubricating oil can be a mixture of lubricants including at least one of polyol ester and synthetic alkyl aromatic lubricant compound. As an example, the mixture can include as its primary component a polyol ester based lubricating oil and a suitable secondary component such as a synthetic lubricant, for example a synthetic alkyl aromatic lubricant, or a mineral oil, naphthenic oil or a paraffinic oil, or mixtures thereof. Similarly, the mixture can include the synthetic alkyl aromatic lubricant as the primary component, mixed with one or more of mineral oil, polyol ester, a naphthenic oil, and a paraffinic oil. Suitable synthetic lubricants include alkylated benzene lubricants.

When a mixture of lubricating oils is employed, it is preferred, but not required, that the secondary component of the oil mixture be present in an amount less than 50% by weight of the oil mixture.

In a further exemplary embodiment, the lubricant is a man-made, synthetic alkyl aromatic lubricant. Suitable synthetic lubricants include alkylated benzene lubricants. The lubricant can be either alkylbenzene alone or mixed with one or more of the other aforementioned lubricants.

Suitable lubricants also include hydrophobic (immiscible with water) lubricants. Preferably no more than 5% by weight of the lubricant is hydrophilic lubricant (some aliphatic hydrocarbon solvents can absorb up to 5% by weight water and still maintain lubricating integrity). More preferably, no more than 2% by weight of the lubricant is hydrophilic lubricant. Most preferably, the refrigerant blend contains no hydrophilic lubricant.

In yet a further exemplary embodiment, the lubricant can be a naphthenic or a paraffinic based lubricating oil that is soluble in dichlorodifluoromethane, chlorodifluoroethane, and tetrafluoroethane, or mixtures thereof. For example, the lubricant can be selected from those lubricants sold by Anderol, Inc., East Hanover, N.J., an affiliate of Royal Lubricants Company, under the trademark ROYCO® 2302. It should be understood, however, that other lubricating oils might also be used, as long as they are compatible with chlorodifluoroethane, tetrafluoroethane, and Refrigerant R-12 (dichlorodifluoromethane) and hydrophobic.

ROYCO® 2302 is a naphthenic oil lubricant having the following composition:

65-85% hydrotreated light naphthenic distillate, 10-20% solvent refined light naphthenic distillate petroleum, <0.5% butylated triphenyl phosphate, and <2% minor additive.

The ROYCO® 2302 lacks the barium dinonylnapthalene sulfonate additive of Royco 783C and 783D.

In an exemplary embodiment, the percentage by weight of lubricant in the refrigerant blend is up to 20%, (based on the combined weight of pentafluoroethane and tetrafluoroethane) preferably 0.5-2%, more preferably 1-2%, even more preferably 1.25-2%, and most preferably 1.5-1.75%. The percentage by weight of lubricant in the refrigerant blend is, for example, 1.75+/−0.05%.

In order for the parts of the refrigerant system to function best, 0.5-20% of total weight of refrigerant should be lubricant. When adding the refrigerant blend to a refrigerant system, one should leave the lubricant in the system if one for some reason takes out the refrigerant being replaced, for example Refrigerant R-22.

While it is intended that the substitute refrigerant according to the invention may be utilized to replace Refrigerant R-22 (chlorodifluoromethane) or one of the other aforementioned refrigerants that has escaped from an apparatus, the substitute refrigerant of the invention can also be utilized to completely refill an apparatus that has been designed for use with Refrigerant R-22 (chlorodifluoromethane), since the refrigerant has a temperature-pressure profile that closely approximates that of Refrigerant R-22 (chlorodifluoromethane) in the low temperature range. Thus, when the refrigerant is used as a complete replacement for Refrigerant R-22 (chlorodifluoromethane), it is no longer necessary that the lubricant be compatible with chlorodifluoromethane but only that it should be compatible with tetrafluoroethane and pentafluoroethane.

Further, whereas the substitute refrigerant of the invention is less damaging to the ozone layer than Refrigerant R-22 (chlorodifluoromethane) and is useful in low temperature systems, and in particular freezers and cold storage units, it is not so limited in its use. Indeed, the refrigerant may be utilized as a substitute or replacement for Refrigerant R-22 (chlorodifluoromethane) in virtually any low temperature application, thereby eliminating the use of ozone layer-damaging Refrigerant R-22 (chlorodifluoromethane), as well as a substitute for the other aforementioned refrigerants.

In further specifics, the present disclosure provides a canister containing a mixture of tetrafluoroethane and pentafluoroethane optionally packaged with lubricating oil that may be fitted with an outlet manifold that is compatible with, for example, a Refrigerant R-22 (chlorodifluoromethane) recharging manifold that is typically used to recharge an apparatus with the latter refrigerant. Refrigerant may then be allowed to flow from the container through the manifold and into the apparatus to replace Refrigerant R-22 (chlorodifluoromethane) refrigerant that has been lost from the refrigeration system. The same may also apply to replacement of the other aforementioned refrigerants.

When mixing the components of the refrigerant blend of the present disclosure, it is preferred that the lubricant be first mixed with the tetrafluoroethane, then mixed with the pentafluoroethane in the proportions afore mentioned.

The lubricant of the present system is miscible with the pentafluoroethane and tetrafluorethane blend and with R-22 refrigerant. This allows for mixing of residual R-22 refrigerant and the refrigerant of the present disclosure, without the release of significant amounts of residual water in the dryer and subsequent system damage (as will happen if the synthetic lubricants disclosed in Thomas et al. and the DuPont patents are used). This miscibility of the present lubricant allows the replacement refrigerant blend to lubricate the system, preventing damage to the compressor and component parts of the system.

Various optional additives can be included in the lubricant. A corrosion inhibitor can be included. An exemplary corrosion inhibitor is one for anhydrous systems (such corrosion inhibitors comprise calcium, or phosphate salts). Additionally, a surfactant and/or a foaming agent can be included.

The present refrigerant blend is designed to be utilized as a replacement for R-22 or the other aforementioned refrigerants, in low temperature systems. It is designed as a replacement, in which little or no modifications including parts are used to adapt the system for the refrigerant of the present disclosure.

The present refrigerant blend can be used as a low temperature replacement, typically deminimus without retrofitting the equipment or flushing it out. It is recommended that a full vacuum be obtained before adding the refrigerant to the present invention.

BRIEF DESCRIPTION OF THE DRAWINGS

Many aspects of the disclosure can be better understood with reference to the following drawing.

DETAILED DESCRIPTION OF THE PREFERRED EMBODIMENT

Figure 1:
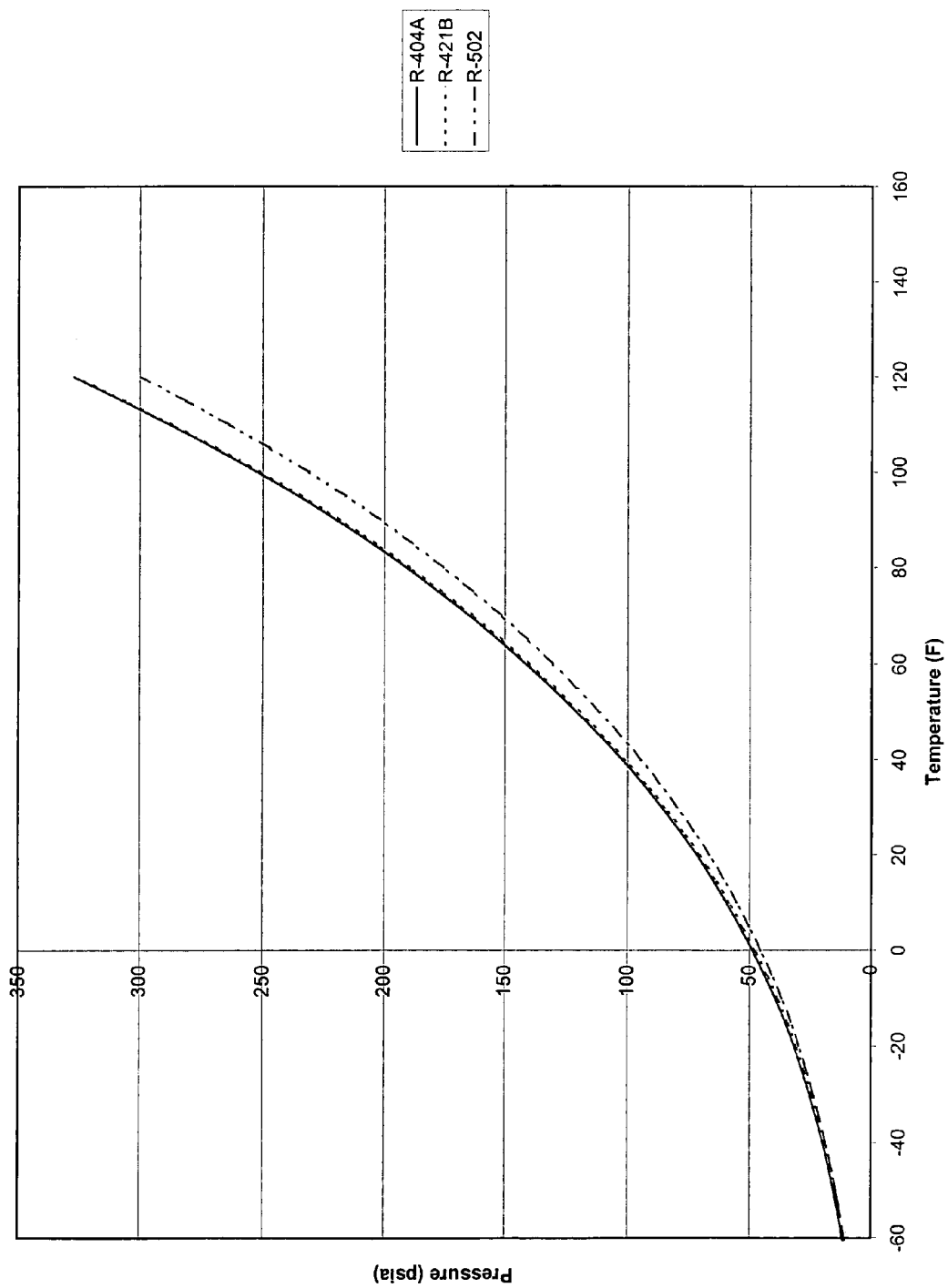
FIG. 1 illustrates pressure versus temperature profiles for an exemplary blend of the refrigerant of the present disclosure in comparison to R-502 and R-404a replacements.

The present disclosure provides a mixture of non-Refrigerant 22 refrigerants that are less damaging to the Earth's ozone layer and that are approved by the U.S. Environmental Protection Agency for use in air-conditioners. The invention mixture is compatible with Refrigerant R-22 (chlorodifluoromethane) and can be used to replace existing Refrigerant R-22 (chlorodifluoromethane) in R-22 based low temperature systems. It is expected that the present invention will gradually replace Refrigerant R-22 (chlorodifluoromethane) in Refrigerant R-22 (chlorodifluoromethane)-based low temperature systems, without the need to retrofit existing Refrigerant R-22 (chlorodifluoromethane)-based systems for non-Refrigerant 22 replacement refrigerants. It can also be used as a replacement for the other aforementioned refrigerants, for example R-502.

Specifically, in one form the present refrigerant blend includes a mixture of pentafluoroethane and tetrafluorethane optionally packaged with a compatible lubricating oil, provided under pressure in a can or cylinder equipped with an outlet compatible with existing Refrigerant R-22 (chlorodifluoromethane), or other refrigerant to be replaced, recharging kit manifolds, so that the refrigerant and lubricant mixture can be added to existing Refrigerant R-22 (chlorodifluoromethane) based coolant systems. Also, the invention provides the possibility of using new refrigerant systems, originally designed for "Refrigerant R-22 (chlorodifluoromethane)," by supplying an EPA-approved refrigerant so that retrofitting to new equipment use is not required.

In an exemplary embodiment, a cylinder can like the standard 25 or 30 lb. can formerly used for containing "Refrigerant R-22 (chlorodifluoromethane)," is provided but containing about 80 to about 90 weight percent pentafluoroethane and about 10 to about 20 weight percent tetrafluoroethane. The can also optionally contains the lubricant packaged with the coolant mixture at up to about 20 weight percent of the total weight of the refrigerant gas mixture. Exemplary embodiments of the lubricant include either polyol ester or a synthetic alkyl aromatic lubricant alone or a mixture of lubricants that includes either polyol ester of a synthetic alkyl aromatic lubricant as the primary component mixed with one or more of the other of polyol ester or a synthetic alkyl aromatic lubricant, mineral oil, naphthenic oil and paraffinic oil.

Existing Refrigerant R-22 (chlorodifluoromethane)-based low temperature systems use an amount of a vegetable or hydrocarbon mineral oil to lubricate the compressor. This oil has a very low vapor pressure, and is not soluble with pure tetrafluoroethane, particularly 1,1,1,2-tetrafluoroethane. Hence, adding tetrafluoroethane to replace Refrigerant R-22 (chlorodifluoromethane) in existing Refrigerant R-22 (chlorodifluoromethane)-based air-conditioning systems can lead to compressor breakdown from lack of sufficient lubrication. The present refrigerant provides a lubricant that is compatible with the mixture of tetrafluoroethane and pentafluoroethane, and with "Refrigerant R-22 (chlorodifluoromethane)," and that is suitable for lubricating refrigerant compressors and other low temperature component parts. The lubricant disclosed herein, on the other hand, is soluble in a tetrafluoroethane/pentafluoroethane mixture. This solubility allows the replacement refrigerant blend to lubricate the air-conditioning system, preventing damage to the compressor and component parts of the system.

One exemplary lubricant is a synthetic alkylate hydrocarbon, such as a man-made, synthetic alkyl aromatic lubricant. One example of such a lubricant is a synthetic alkylbenzene sold under the product name Zerol 30 by Shrieve Chemical products. Zerol 30 is an extra low viscosity, high quality, synthetic alkylbenzene composition having a boiling point of greater than 240° C. at atmospheric pressure, a specific gravity at 15° C. of 0.86-0.88, a viscosity of 4-8 cSt at 40° C. (typically about 5.5 cSt), a pour point of −35° C. max (typically −40° C.), and a water content of 30 ppm in bulk. Such a synthetic alkylate hydrocarbon lubricant can also include one or more of mineral oil, naphthenic oil, paraffinic oil or polyol ester (POE) mixed with the synthetic lubricant. Another exemplary lubricant is polyolester (POE) either alone or mixed with one or more of a synthetic alkylate hydrocarbon, mineral oil, naphthenic oil, or paraffinic oil. Yet another exemplary lubricant is the aforementioned Royco 2302 naphthenic lubricant.

The present disclosure provides lubricants that are compatible with the invention mixture of tetrafluoroethane and chlorodifluoroethane, and with "Refrigerant R-12 (dichlorodifluoromethane)," and that are suitable for lubricating refrigerant compressors and other air-conditioner component parts. While alkylbenzene alone is considered not miscible with tetrafluoroethane (in particular R134a), it is sufficiently soluble in the present tetrafluoroethane/chlorodifluoroethane mixture. This solubility allows the replacement refrigerant blend to lubricate the system, preventing damage to the compressor and component parts of the system.

EXAMPLE

Pentafluoroethane and 1,1,1,2-tetrafluoroethane are mixed in a ratio of 85 to 15 weight percent respectively and packaged with a polyol ester based lubricating oil such that the temperature-pressure profile of the pentafluoroethane/tetrafluoroethane mixture is similar to that of Refrigerant R-22 (chlorodifluoromethane), over the normal operating range of air-conditioners. Table 1 summarizes the temperature-pressure profile of the mixture over the range of normal air-conditioner working temperatures, from −60 degree F. to 120 degree F.

FIG. 1 compares the Pressure (liquid) vs. Temperature profile for the 85/15 blend of pentafluoroethane and tetrafluoroethane respectively, to that of R-502 and R-404a replacements.

Table 1 presents a comparison to not only R-502 but also R-404 and R-408 refrigerants. It can be seen that the present refrigerant mixture approximates well not only the temperature-pressure profile of R-22 in the low temperature range, but also R-404a and R-502.

The apparatus and method of the preferred embodiment encompass the use of a mixture of pentafluoroethane and tetrafluoroethane at the ranges, as discussed above, optionally with a lubricating oil at ranges, as discussed above of up to about 20% by weight of the refrigerant gas mixture in the operation of an air-conditioning system, wherein the coolant-oil mixture replaces Refrigerant R-22 (chlorodifluoromethane) in a Refrigerant R-22 (chlorodifluoromethane)-based refrigeration system, or one of the other aforementioned refrigerants.

The method and apparatus in the preferred embodiment further details providing the above described mix of pentafluoroethane/tetrafluoroethane and optional lubricating oil in 30 lb. cylinders, where the cylinders are pressure sealed and fitted with an outlet compatible for, for example, existing Refrigerant 22-type refrigeration manifolds typically ¼ inch male flare.

Further, it was noted that the systems tested ran more smoothly and the compressor showed less vibration at low temperature applications during the test period, as the mixture of the invention was added. It is theorized that the lubricating oil, being soluble in the refrigerant gasses, was better able to lubricate the compressor and reciprocating parts than, for example, the existing Refrigerant R-22 (chlorodifluoromethane) lubricant used by itself. In some applications a reduction in power consumption maybe also noted.

The refrigerant of the present disclosure can also be used as a replacement refrigerant for, for example, the new R-22 low temperature systems, such as the systems used in today's HFC-free units Pure refrigerant 1,1,1,2-tetrafluoroethane is not miscible with mineral seal oil. Pentafluoroethane is miscible with polyol ester synthetic, alkyl aromatic lubricating oils and mineral oils. The presence of the pentafluoroethane allows the use of mineral oils in the refrigerant blend and system of the present invention (a translucent, partially miscible blend is formed).

Phosphated additives add corrosion resistance in the presence of acids and salts and increase wear resistance. Calcium additives help the lubricant resist rust and the effects of corrosion; calcium salts reduce the corrosive effects of hydrochloric acid that is formed in the presence of water and the chlorinated gases present in the refrigerant systems of the present invention.

The lubricant can also include compounds such as acrylic polymers to increase wear resistance under severe conditions. Acrylics can help film formation, and the ability of the lubricant to coat metal and soft parts and stay in place.

The lubricant of the present invention is miscible with R-22, the R-22 lubricant, and the blend of the refrigerant gases of the present invention.

It should be understood that variations and modifications may be made of the invention herein taught, and that those are within the scope and spirit of the invention as taught above and claimed here below.

TABLE 1

| Temp F. | R-502 | Low-Temp | R-404 | R-408 |
|---|---|---|---|---|
| −60 | −7.9 | −7.6 | −6.5 | −7.7 |
| −55 | −4.6 | −4.2 | −3.0 | −4.4 |
| −50 | −1.0 | −0.4 | 0.7 | −0.7 |
| −45 | 1.8 | 2.2 | 2.9 | 2.0 |
| −40 | 4.0 | 4.5 | 5.2 | 4.2 |
| −35 | 6.4 | 7.0 | 7.8 | 6.7 |
| −30 | 9.0 | 9.9 | 10.7 | 9.4 |
| −25 | 11.9 | 12.9 | 13.8 | 12.4 |
| −20 | 15.1 | 16.3 | 17.2 | 15.6 |
| −15 | 18.5 | 20.0 | 20.9 | 19.2 |
| −10 | 22.3 | 24.0 | 25.0 | 23.0 |
| −5 | 26.3 | 28.4 | 29.4 | 27.2 |
| 0 | 30.7 | 33.1 | 34.1 | 31.7 |
| 5 | 35.4 | 38.2 | 39.3 | 36.6 |
| 10 | 40.5 | 43.7 | 44.8 | 41.9 |
| 15 | 46.0 | 49.6 | 50.8 | 47.6 |
| 20 | 51.9 | 56.0 | 57.2 | 53.7 |
| 25 | 58.2 | 62.8 | 64.0 | 60.2 |
| 30 | 64.9 | 70.1 | 71.4 | 67.2 |
| 35 | 72.1 | 77.9 | 79.2 | 74.7 |
| 40 | 79.8 | 86.3 | 87.6 | 82.7 |
| 45 | 88.0 | 95.2 | 96.5 | 91.2 |
| 50 | 96.7 | 104.7 | 106.0 | 100.3 |
| 55 | 105.9 | 114.7 | 116.0 | 109.9 |
| 60 | 115.7 | 125.4 | 126.7 | 120.1 |
| 65 | 126.0 | 136.7 | 138.1 | 130.9 |
| 70 | 137.0 | 148.7 | 150.0 | 142.4 |
| 75 | 148.6 | 161.4 | 162.7 | 154.5 |
| 80 | 160.8 | 174.9 | 176.1 | 167.2 |
| 85 | 173.7 | 189.0 | 190.2 | 180.7 |
| 90 | 187.2 | 204.0 | 205.2 | 194.9 |
| 95 | 201.5 | 219.7 | 220.9 | 209.9 |
| 100 | 216.6 | 236.3 | 237.4 | 225.6 |
| 105 | 232.2 | 253.7 | 254.8 | 242.2 |
| 110 | 248.9 | 272.1 | 273.1 | 259.6 |
| 115 | 266.3 | 291.4 | 292.3 | 277.9 |
| 120 | 284.6 | 311.6 | 312.5 | 297.0 |

What is claimed as the invention is:

1. A refrigerant composition comprising a combination of refrigerant gases and non-refrigerant gas components,
    (a) the refrigerant gases consisting of:
        about 84% to about 86% by weight pentafluoroethane; and
        about 14% to about 16% by weight tetrafluoroethane; and
    (b) the non-refrigerant gas components including about 0.5% to about 20% by weight of the refrigerant gases of a lubricating oil that includes polyol ester, or a synthetic alkyl aromatic compound, or a mixture of polyol ester and a synthetic alkyl aromatic compound, as its primary component.

2. The refrigerant according to claim 1, wherein the lubricating oil consists essentially of a polyol ester based lubricating oil.

3. The refrigerant according to claim 1 wherein said pentafluoroethane is present in the ratio of about 85% by weight to said tetrafluoroethane present in an amount of about 15% by weight.

4. The refrigerant according to claim 1, wherein the lubricating oil is a synthetic alkyl aromatic lubricant.

5. The refrigerant according to claim 4, wherein the synthetic alkyl aromatic lubricant is an alkylbenzene.

6. The invention according to claim 1, wherein the refrigerant further includes an acrylic polymer or a corrosion inhibitor or both.

7. The refrigerant of claim 1, where the lubricating oil further includes a naphthenic or a paraffinic based lubricating oil.

8. A method for refilling an apparatus using a refrigerant, the method comprising:
    (1) supplying a substitute refrigerant composition under pressure, in a cylinder can fitted with an outlet compatible with a chlorodifluoromethane recharging manifold of the apparatus; and
    (2) adding to said apparatus via the manifold the substitute refrigerant for chlorodifluoromethane, said substitute refrigerant composition comprising a combination of refrigerant gases and non-refrigerant gas components, (a) the refrigerant gases consisting of:
about 84% to about 86% by weight pentafluoroethane, and
about 14% to about 16% by weight tetrafluoroethane; and (b) the non-refrigerant gas components including about 0.5% to about 20% by weight of the refrigerant gases of a lubricating oil that includes polyol ester, or a synthetic alkyl aromatic compound, or a mixture of polyol ester and a synthetic alkyl aromatic compound, as its primary component.

9. The method according to claim 8, the lubricating oil including a polyol ester lubricating oil as its primary component.

10. The method according to claim 8 wherein in the substitute refrigerant said pentafluoroethane is present in the ratio of about 85% by weight to said tetrafluoroethane present in an amount of about 15% by weight.

11. The method according to claim 8, wherein the lubricating oil is a synthetic alkyl aromatic lubricant.

12. The method according to claim 8, wherein the refrigerant further includes an acrylic polymer or a corrosion inhibitor or both.

13. The method according to claim 8, wherein the lubricating oil is an alkylbenzene.

14. The method of claim 8, wherein the lubricating oil includes a naphthenic or a paraffinic based lubricating oil.

* * * * *